US006415285B1

(12) United States Patent
Kitajima et al.

(10) Patent No.: US 6,415,285 B1
(45) Date of Patent: Jul. 2, 2002

(54) DOCUMENT RETRIEVAL MEDIATING APPARATUS, DOCUMENT RETRIEVAL SYSTEM AND RECORDING MEDIUM STORING DOCUMENT RETRIEVAL MEDIATING PROGRAM

(75) Inventors: Hironobu Kitajima; Ryusuke Masuoka; Fumihiro Maruyama, all of Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/456,820

(22) Filed: Dec. 8, 1999

(30) Foreign Application Priority Data

Dec. 10, 1998 (JP) ............................................. 10-351114

(51) Int. Cl.⁷ .............................................. G06F 17/30

(52) U.S. Cl. .............................. 707/5; 707/102; 707/10; 707/3

(58) Field of Search ......................... 707/1–206, 500.1, 707/501.1, 514; 709/200–203

(56) References Cited

U.S. PATENT DOCUMENTS

| 5,966,535 A | * 10/1999 | Benedikt et al. ............... 707/10 |
| 5,978,577 A | * 11/1999 | Rierden et al. ................. 707/3 |
| 5,978,803 A | * 11/1999 | Ooe ............................. 707/10 |

FOREIGN PATENT DOCUMENTS

| JP | 5-28195 | 2/1993 |
| JP | 5-324436 | 12/1993 |
| JP | 7-334516 | 12/1995 |
| JP | 10-326284 | 12/1998 |

OTHER PUBLICATIONS

Stephens et al., "Consensus ontologies. Reconciling the semantics of Web pages and agents", IEEE Internet Computing, vol. 5, Issue 5, Sep.–Oct. 2001, pp. 92–95.*

Mao et al., "Empirical performance evaluation methodology and its application to page segmentation algorithms", Pattern Analysis and Machine Intelligence, IEEE Transactions on, vol. 23, Issue 3, Mar. 2001, pp. 242–256.*

Salembler et al., "MPEG–7 multimedia description schemes", Circuits and Systems for Video Technology, IEEE Transactions on, vol. 11, Issue 6, Jun. 2001, pp. 748–759.*

Yashino, Toshiaki, et al., "Commercial Database Integration Using by a Facilitator", Journal of IEICE, D–1, vol. J81–D–1, No. 5, pp. 460–467 (1998). No Translation.

Kihara, Hideto et al., "Information Retrieval System Based on Multi–Agents", IPSJ SIGNotes, vol. 96, No. 40, pp. 25–30 (1996). No Translation.

Sudo, Masanori et al., "Database Selection for Information Retrieval Under Heterogeneous Distributed Database Environments", IPSJ SIGNotes, vol. 97, No. 38, pp. 9–16 (1997) with the partial English translation.

Kihara, Hideto et al., "Information Retrieval System on WWW Using Agents", Technical Report of IEICE, vol. 98, No. 58, pp. 23–28 (1998) with partial English translation.

* cited by examiner

Primary Examiner—David Jung
(74) Attorney, Agent, or Firm—Staas & Halsey LLP

(57) ABSTRACT

A document retrieval system of the present invention includes an agent system that facilitates document retrieval by mediating a search request from a user to databases provided with search engines that search for a document with a keyword. When a facilitating agent is supplied with a search request containing a keyword, the facilitating agent refers to a facilitating database that stores keyword information indicating the relationship between the keyword and the databases provided with search engines for each keyword so as to determine a database agent to which the search request is to be sent out.

20 Claims, 19 Drawing Sheets

Keyword information

| Keyword |
|---|
| Search engine name |
| The number of documents |
| Timestamp |

FIG. 3A

Access history information

| Keyword |
|---|
| The number of search requests |
| Timestamp |

FIG. 3B

(and (or <keyword1> <keyword2>) <keyword3>))

FIG . 5A (and (or (<keyword1> ?search-engine-name ?the-number-of-documents ??)

(<keyword2> ?search-engine-name ?the-number-of-documents ??))

(<keyword3> ?search-engine-name ?the-number-of-documents ??)

```
(ask-all
: content
(and
(has ?database ?doc)
(and (keyword ?doc"Java")
(or (keyword ?doc"ORACLE")
(keyword ?doc"MS ACCESS")
(not (keyword ?doc"VisualBasic"))))
(url ?doc ?url)
(title ?doc ?title)
(document-size ?doc ?document-size)
(register-date ?doc ?register-date)
(outline ?doc ?outline)
(search-rank ?doc ?search-rank))
: aspect (?url ?title ?document-size ?register-date
?outline ?search-rank)
: sender UA1
: receiver FA)
```

FIG . 7

(reply

: content ( ("http://www.fujitsu.co.jp" "homepage1"1345

"19971205T000000000" "A computer in a space shuttle..."

31.3)

("http://abc.www.fujitsu.co.jp" "homepage2"2012

"19960303T000000000" "very convenient information..." 12.5))

: sender DA1

: receiver FA

(advertise

: content (keyword-info <keyword> <search engine name>

<the number of documents> <timestamp>)

: sender <database agent name>

: receiver <facilitating agent name>

```
(achieve

: content (advertised)

: sender <facilitating agent name>

: receiver <database agent name>

(advertise

: content (know-category <search engine name> <category name>)

: sender <database agent name>

: receiver <facilitating agent name

```
(ask-all

: content (and (category   ?database"finance")

(has ?database ?doc)

(and (keyword ?doc"Java")

(or (keyword ?doc"ORACLE")

(keyword ?doc"MS ACCESS")

(not (keyword ?doc"VisualBasic"))))

(url ?doc ?url)

(title ?doc ?title)

(document-size ?doc ?document-size)

(register-date ?doc ?register-date)

(outline ?doc ?outline)

(search-rank ?doc ?search-rank))

: aspect (?url ?title ?document-size ?register-date

?outline ?search-rank)

: sender UA1

: receiver FA)
```

FIG. 14

User profile information

| User name |
|---|
| Availability level |
| Department to which user belongs |
| Post |
| Area |

FIG. 18A

Database profile information

| Database name |
|---|
| Availability level |
| Department to which database belongs |
| Area |

FIG. 18B

DOCUMENT RETRIEVAL MEDIATING APPARATUS, DOCUMENT RETRIEVAL SYSTEM AND RECORDING MEDIUM STORING DOCUMENT RETRIEVAL MEDIATING PROGRAM

BACKGROUND OF THE INVENTION

1. Field of the Invention

The present invention relates to a document retrieval facilitating apparatus that mediates between a user and a plurality of databases with search engines for efficient retrieval of a document from the databases, and a document retrieval system utilizing this document retrieval facilitating apparatus.

2. Description of the Related Art

Conventionally, databases that store and control document data containing text data and image data have been widely spread. In addition, various search engines that access such a database to search document data by a pattern match using a keyword or perform logic operations have been widely used.

In recent years, with the development of a large scale computer network such as the internet, it has become easy to access a remote database. With this development, a variety of software programs are provided as search engines that can be used on the internet. Such a search engine is used to search a document database for a document, not only on the internet, but also on an intranet or the like.

However, in principle, a conventional search engine is assumed to be used to search data that are stored physically and logically in one place. For this reason, in the case where there are a plurality of accessible dada bases with search engines, a user is required to perform troublesome operations such as accessing each of the plurality of search engines individually and repeating the work of searching for a document for each search engine, in order to retrieve the document from a wide range of databases.

Furthermore, although it is possible to prepare a batch program for accessing a plurality of search engines, the way in which the search conditions such as a search keyword are assigned is different from search engine to search engine. Therefore, it is difficult to prepare a general program that covers very search engine. Moreover, the retrieval efficiency is poor.

SUMMARY OF THE INVENTION

Therefore, with the foregoing in mind, it is an object of the present invention to provide a document retrieval facilitating apparatus and a document retrieval system that can retrieve a document with a plurality of search engines efficiently, utilizing a system organized by autonomous program units referred to as agents.

A first document retrieval facilitating apparatus of the present invention facilitates document retrieval by mediating a search request containing a keyword to a database provided with a search engine. The search engine searches for a document with the keyword. The document retrieval facilitating apparatus includes a facilitating database for storing relation information indicating a relationship between the keyword and the database provided with the search engine for each keyword; and facilitating means for referring to the facilitating database using the keyword contained in the supplied search request so as to determine the database provided with the search engine to which the search request is to be sent out.

In this embodiment, the facilitating means determines the database provided with the search engine to which a search request is to be sent out by referring to the relation information indicating the relationship between the keyword and the database provided with the search engine. Therefore, the user that inputs the search request is not required to be aware of which database provided with a search engine should be searched, and a wasteful action such as searching a database provided with a search engine irrelevant to the keyword can be avoided. Thus, the present invention provides a document retrieval facilitating apparatus that can retrieve the document efficiently.

A second document retrieval facilitating apparatus of the present invention facilitates document retrieval by mediating a search request containing a keyword to a database provided with a search engine. The search engine searches for a document with the keyword. The document retrieval facilitating apparatus includes a facilitating database for storing category information indicating the type of the document possessed by the database provided with a search engine for each database provided with a search engine; and facilitating means for referring to the facilitating database using a category name contained in the supplied search request so as to determine the database provided with the search engine to which the search request is to be sent out.

In this embodiment, the facilitating means determines the database provided with a search engine to which a search request is to be sent out by referring to the category information indicating the relationship between the type of the document and the database provided with a search engine. Therefore, the user that inputs the search request is not required to be aware of which database provided with a search engine should be searched, and a wasteful action such as searching a database provided with a search engine that stores only the documents irrelevant to the category can be avoided. Thus, the present invention provides a document retrieval facilitating apparatus that can retrieve the document efficiently.

A first document retrieval system includes a database provided with a search engine that searches for a document with a keyword and a document retrieval facilitating apparatus. The document retrieval facilitating apparatus includes a facilitating database for storing facilitating information indicating the relationship between the keyword and the database provided with a search engine; and facilitating means for referring to the facilitating database so as to determine the database provided with a search engine to which the search request is to be sent out. The database provided with a search engine spontaneously notifies the facilitating database of the facilitating information.

In this embodiment, the database provided with a search engine spontaneously notifies the facilitating database of the facilitating information indicating the relationship between the keyword and the database provided with a search engine so that the content of the facilitating database is updated. Thus, in the database provided with a search engine, for example, when a new document is added or a document is deleted, the content of the facilitating database is updated. Therefore, the facilitating means can mediate in response to the actual status. Consequently, the user is not required to be aware of the current status of the database provided with a search engine, and a document retrieval facilitating apparatus that can retrieve a document efficiently can be provided.

A second document retrieval system includes a database provided with a search engine that searches for a document with a keyword and a document retrieval facilitating apparatus. The document retrieval facilitating apparatus includes a facilitating database for storing facilitating information indicating the relationship between the keyword and the database provided with a search engine; and facilitating means for referring to the facilitating database so as to determine the database provided with the search engine to which the search request is to be sent out. The facilitating means acquires the facilitating information to be stored in the facilitating database by inquiring of the database provided with a search engine.

In this embodiment, the content of the facilitating database can be updated by inquiring of the database with a search engine about the facilitating information indicating the relationship between the keyword and the database provided with a search engine. Thus, in the database provided with a search engine, for example, when a new document is added or a document is deleted, the content of the facilitating database is updated. Therefore, the facilitating means can mediate in response to the actual status. Consequently, the user is not required to be aware of the current status of the database provided with a search engine, and a document retrieval facilitating apparatus that can retrieve a document efficiently can be provided.

A third document retrieval system includes a database provided with a search engine that searches for a document with a keyword and a document retrieval facilitating apparatus. The document retrieval facilitating apparatus includes a facilitating database for storing facilitating information indicating the relationship between the keyword and the database provided with the search engine for each keyword; and facilitating means for referring to the facilitating database using the keyword contained in the supplied search request so as to determine the database provided with the search engine to which the search request is to be sent out.

In this embodiment, the facilitating means of the document retrieval facilitating apparatus determines the database provided with the search engine to which the search request is to be sent out by referring to the relation information indicating the relationship between the keyword and the database provided with a search engine. Therefore, the user that inputs the search request is not required to be aware of which database provided with a search engine should be searched, and a wasteful action such as searching a database provided with a search engine irrelevant to the keyword can be avoided. Thus, the present invention provides a document retrieval facilitating apparatus that can retrieve the document efficiently.

A fourth document retrieval system includes a database provided with a search engine that searches for a document with a keyword and a document retrieval facilitating apparatus. The document retrieval facilitating apparatus includes a facilitating database for storing category information indicating the type of the document possessed by the database provided with a search engine for each database provided with a search engine; and facilitating means for referring to the facilitating database using a category name contained in the supplied search request so as to determine the database provided with the search engine to which the search request is to be sent out.

In this embodiment, the facilitating means of the document retrieval facilitating apparatus determines the database provided with the search engine to which the search request is to be sent out by referring to the category information indicating the relationship between the type of the document and the database provided with a search engine. Therefore, the user that inputs the search request is not required to be aware of which database provided with a search engine should be searched, and a wasteful action such as searching a database provided with a search engine that stores only the documents irrelevant to the category can be avoided. Thus, the present invention provides a document retrieval facilitating apparatus that can retrieve the document efficiently.

Furthermore, the document retrieval facilitating apparatus of the present invention can be configured by a computer based platform by installing a processing program that can provide processing steps for realizing the above-described document retrieval facilitating apparatuses of the present invention.

These and other advantages of the present invention will become apparent to those skilled in the art upon reading and understanding the following detailed description with reference to the accompanying figures.

BRIEF DESCRIPTION OF THE DRAWINGS

FIG. 3A is a diagram showing information stored in a facilitating database, and FIG. 3B is a diagram showing the structure of access history information.

FIG. 5A shows an example of a keyword condition equation extracted from a search request message, and FIG. 5B shows an example of a search condition equation for search of a facilitating database generated from the keyword condition equation.

FIG. 7 shows a specific example of the description of the search request message.

FIG. 8 shows an example of a response message returned to the facilitating agent from the database agent to which the search request message of FIG. 7 is sent out.

FIG. 9 shows the structure of a notification message with which the database agent notifies the facilitating agent of keyword information of a document possessed by its subordinate search engine.

FIG. 10 shows the structure of a message with which the facilitating agent notifies the database agent of keyword information.

FIG. 13 shows the structure of a notification message with which the database agent notifies the facilitating agent of category information.

FIG. 14 shows a specific example of a search request message in the document retrieval system of Embodiment 2.

FIGS. 18A and 18B show information stored in an identification database included in the document retrieval system of Embodiment 3, and FIG. 18A is a diagram showing the structure of user profile information and FIG. 18B is a diagram showing the structure of database profile information.

DESCRIPTION OF THE PREFERRED EMBODIMENTS

The present invention will be described more specifically below.

Embodiment 1

Hereinafter, a document retrieval system of a first embodiment of the present invention will be described with reference to the accompanying drawings.

Figure 2:
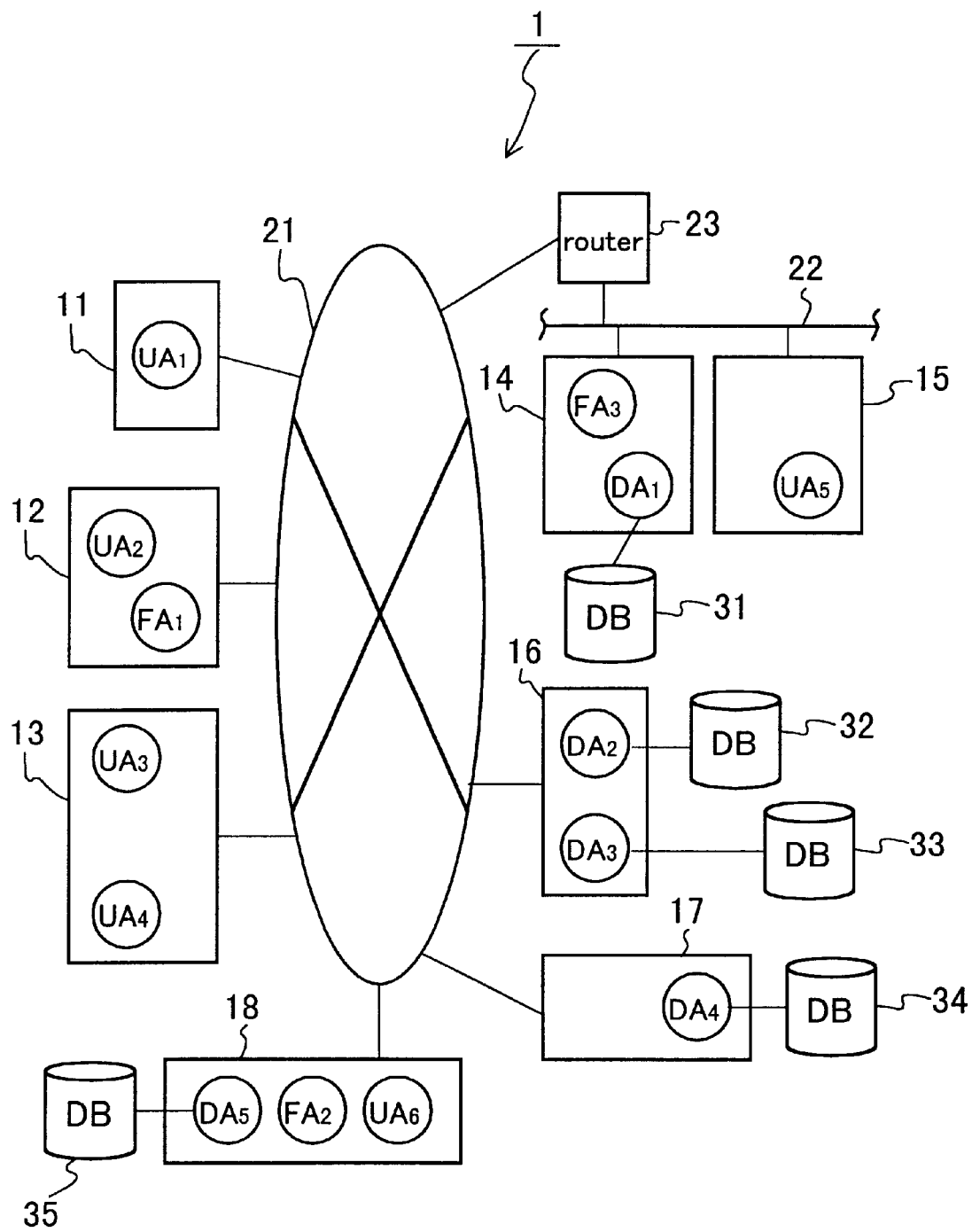
FIG. 2 is a block diagram showing the agent system of the document retrieval system.

FIG. 2 shows a schematic configuration of the document retrieval system of this embodiment.

As shown in FIG. 2, in the document retrieval system 1 of this embodiment, a plurality of computer systems 11 to 18 provided with CPUs, memories and the like are connected to each other via networks 21 and 22 such as a WAN (wide area network) or a LAN (local area network). The networks 21 and 22 are connected by a router 23.

The document retrieval system 1 includes a plurality of databases 31 to 35. Each of the databases 31 to 35 is provided with a search engine (not shown) that searches document data by a pattern match with a keyword and performs logic operations. This search engine allows a document to be retrieved from each of the databases 31 to 35.

Herein, "document" in this embodiment and other embodiments described later includes various data such as text data, illustrations, images or combinations thereof. Sound data and moving picture data may be included.

As for the relationship between the document and the keyword, for example, an appropriate character string contained in a document may be used as the keyword of the document. Alternatively, a word conceptually extracted from the content of a document may be used as the keyword of the document. In addition, one document may have a plurality of keywords.

Figure 1:
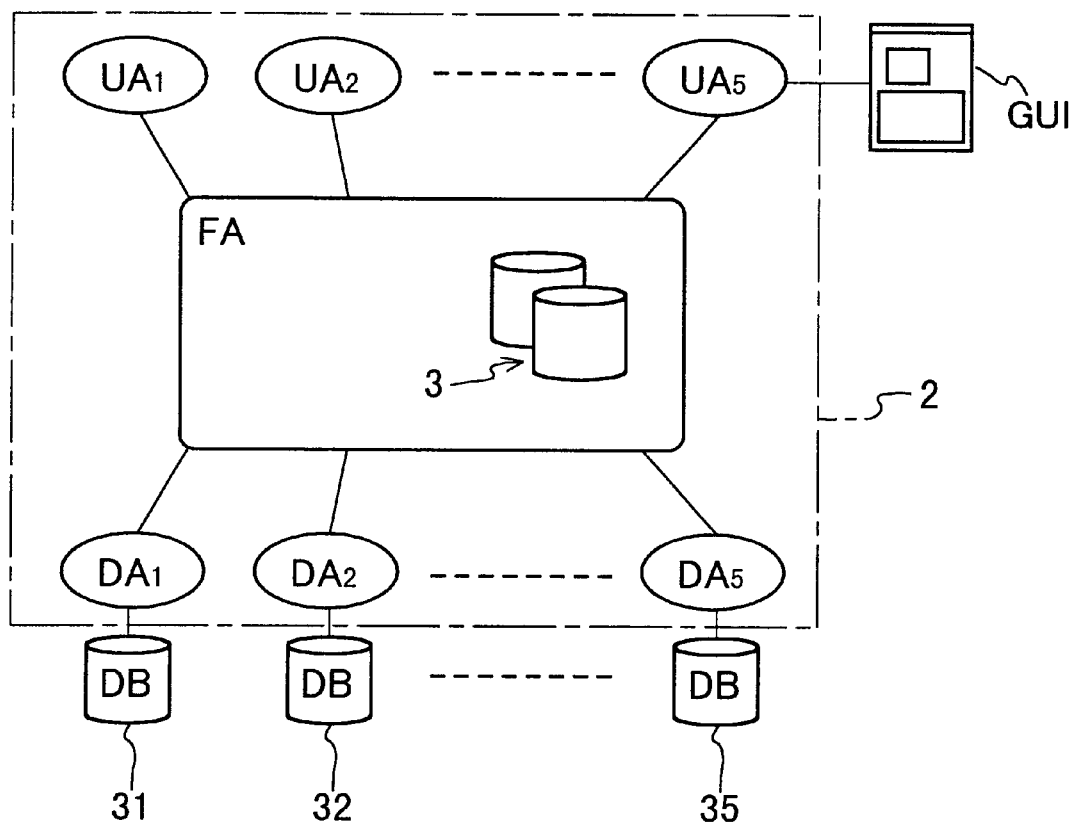
FIG. 1 is a block diagram showing the configuration of a document retrieval system of Embodiment 1 of the present invention.

In the document retrieval system 1, when the user inputs a search request, an agent system 2 that is organized by autonomous program units called agents mediates the search request to the databases 31 to 35, as shown in FIG. 1.

More specifically, as shown in FIGS. 1 and 2, the agent system 2 of the document retrieval system 1 includes a user agent UA, a database agent DA and a facilitating agent FA, which also is referred to as a facilitator. These agents communicate with each other in a predetermined standard language via the networks 21 and 22.

The user agent UA is connected to a user interface that uses a GUI (graphical user interface) or the like and acts as an agent of the user. The user agent UA converts an call for a procedure or an event generated by the user interface to a message described in the standard language of the agent system 2 and sends out the message to other agents.

The database agent DA is provided in each corresponding search engine of the databases 31 to 35. More specifically, in this embodiment, the database 31 is subordinate to the database agent $DA_1$. The database 32 is subordinate to the database agent $DA_2$. The database 33 is subordinate to the database agent $DA_3$. The database 34 is subordinate to the database agent $DA_4$. The database 35 is subordinate to the database agent $DA_5$.

The database agent DA understands the standard language of the agent system 2. When the database agent DA receives a search request message containing a search request of the user, it converts the search request message to a search interface adapted to its subordinate search engine so that the subordinate search engine can search for the document.

Furthermore, the database agent DA converts the search result obtained from the subordinate search engine into the standard language of the agent system 2 and sends out the converted search result to the agent that originally sent out the search request message or other agents. The database agent DA notifies the facilitating agent FA of information about the documents possessed by its subordinate search engine.

The facilitating agent FA has a facilitating database 3 where the information about the documents possessed by each of the databases 31 to 35 is stored. Based on the information stored in the facilitating database 3, the facilitating agent FA selects the database agent DA to which the search request message from the user agent UA is to be sent out.

Hereinafter, the information stored in the facilitating database 3 will be described with reference to FIGS. 3A and 3B. In this embodiment, the facilitating database 3 stores keyword information indicating the number of documents containing a predetermined keyword for each search engine. The keyword information contains "keyword", "search engine name", "the number of documents" and "timestamp" as the attributes thereof, as shown in FIG. 3A. As the attribute value of "the number of documents", the number of documents that contain the keyword indicated by the attribute value of the "keyword" among the documents possessed by the search engine whose name is indicated by the attribute value of the "search engine name" is stored.

The facilitating agent FA demands the database agent DA to notify the latest keyword information, whenever necessary, so that the facilitating database 3 is updated constantly. The attribute value of "timestamp" is a time when the keyword information is generated.

The facilitating database 3 stores access history information for each keyword, in addition to the keyword information. The access history information has "keyword", "the number of times of search", and "timestamp" as the attributes thereof. How many times the facilitating agent FA has received a search request message containing this keyword from the user agent is stored as the attribute value of "the number of times of search". A time when the keyword information is generated is stored as the attribute value of the "timestamp".

Figure 4:
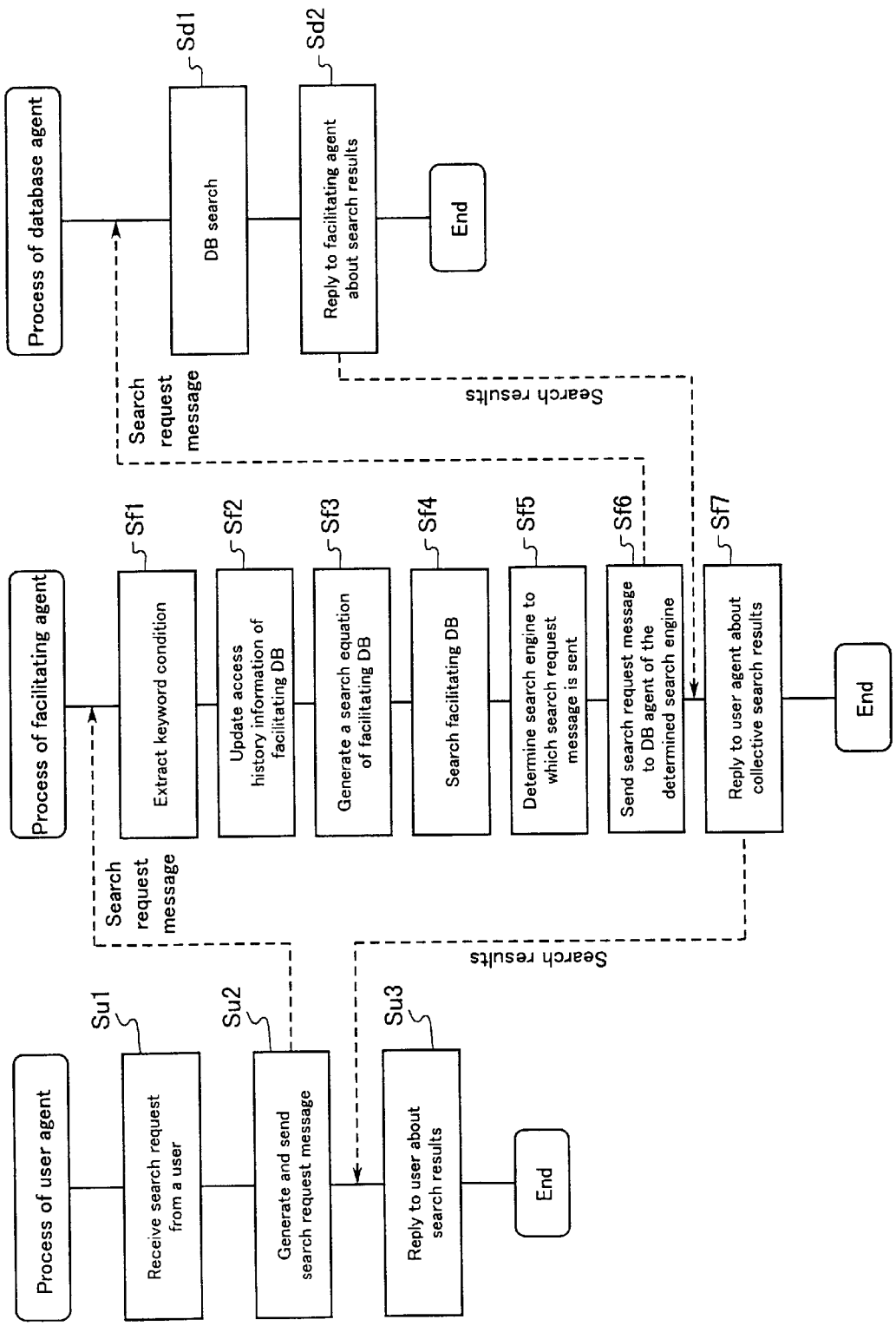
FIG. 4 is a flowchart showing the process procedure of each agent when it has received a search request from a user.

Next, a process procedure for retrieving a document in the document retrieval system 1 will be described with reference to the flowchart of FIG. 4. In FIG. 4, the processing steps of the user agent UA are shown by Su1, Su2 . . . . The processing steps of the facilitating agent FA are shown by Sf1, Sf2 . . . . The processing steps of the database agent DA are shown by Sd1, Sd2 . . . .

When the user agent UA receives a request to search for a document from a user (step Su1), it generates a search request message based on the search request and sends it out to the facilitating agent FA (step Su2).

When the facilitating agent FA receives the search request message from the user agent UA, it first extracts a portion regarding the keyword from the search conditions contained in the search request message (step Sf1). This generally is a combination of keyword conditions using the Boolean operation.

Next, the facilitating agent FA updates the access history information of the facilitating database with respect to a set of keywords that satisfy the extracted keyword conditions (step Sf2), and generates a search condition equation for searching for keyword information stored in the facilitating database 3 with respect to the set of keywords (step Sf3).

FIGS. 5A shows a specific example of the equation of keyword conditions extracted from the search request message, and 5B shows a specific example of the search condition equation for searching the facilitating database 3 that is generated from the equation of keyword conditions.

For example, the case where the keyword conditions extracted from the search request message are those as shown in FIG. 5A will be described below. This condition equation is directed to retrieve a document containing "keyword 1" or "keyword 2" and containing "keyword 3". FIG. 5B shows the search condition equation for searching the facilitating database 3 that is generated by the facilitating agent FA from this condition equation.

In the search condition equation of FIG. 5B, the mark "?" is assigned to the head of a variable name and the mark "??" indicates an anonymous variable that can be any value. This search condition equation is a equation for retrieving a search engine name that satisfies the Boolean variable designated by this search condition equation from the facilitating database 3 with respect to the three keywords, "keyword 1", "keyword 2" and "keyword 3".

The facilitating agent FA searches the facilitating database 3 using the thus generated search condition equation (step Sf4). The facilitating database 3 refers to the stored keyword information and responds to the facilitating agent FA by supplying the set of search engine names having the document that satisfies the search conditions and the number of the documents in each of the search engines as the search results.

The facilitating agent FA determines the search engine name that can be recommended to the search request of the user, based on the search results of the facilitating database 3 (step Sf5). In this case, the facilitating agent FA does not necessarily recommend only one search engine but can recommend a plurality of search engines in order of the number of documents from the search engine with the largest number in view of the search results of the facilitating database 3, if necessary.

Next, the facilitating agent FA sends out the search request message received from the user agent UA to the database agent DA that has the search engine specified in step Sf5 as the subordinate thereof and awaits a reply (step Sf6). In the case where a plurality of search engines are specified in step Sf5, the search request message is sent out to all of these search engines.

Since the search request message is described in the standard language of the agent system 2, the database agent DA that has received the search request message converts the search request message into a language expression that the search engine can understand and delivers it to the search engine for search of the database DB (step Sd1). When the database agent DA receives the search result from the search engine, it supplies the search result to the facilitating agent FA as a reply (step Sd2).

When the facilitating agent FA receives the replies from all the database agents to which the facilitating agent FA sent out the search request message in step Sf6, it integrates all the replies into one message and supplies the message as the search results to the user agent UA that originally sent out the search request message (step Sf7).

Then, the user agent UA supplies the search results received from the facilitating agent FA to the user as a reply via the user interface (step Su3). Then, the search process ends.

Figure 6:
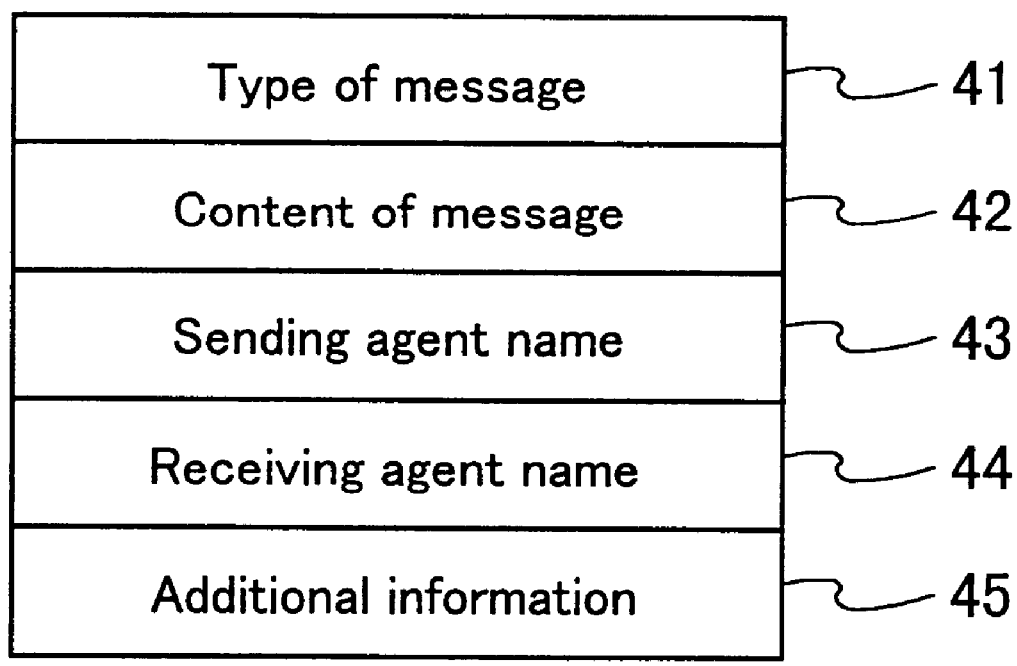
FIG. 6 is a diagram showing the structure .of the message exchanged between the agents.

FIG. 6 shows the structure of a message exchanged between the agents of the agent system 2. The message between the agents is described in the standard language so that all the agents understand the message. As shown in FIG. 6, the message includes a message type 41, a message content 42, a sending agent name 43, a receiving agent name 44 and additional information 45 in its structure.

The message type 41 indicates the type of the message. For example, "ask-all" indicating a search request message, "reply" indicating a reply message, "advertise" indicating a notification message with which certain information is notified to other agents, and "achieve" indicating to request a certain status to be achieved are entered in the message type 41 as the attribute values.

In the sending agent 43, the name of a user agent that is the sender of the search request message is entered. In the receiving agent 44, the name of the facilitating agent to which the search request is sent out is entered. The message content 42 is expressed in the predicate logic.

FIG. 7 shows a specific example of description of the search request message, and "ask-all" on the top of the description corresponds to the message type 41 and indicates that this message is a search request message, as described above. In the search request message of FIG. 7, a portion attached with ":" at the head is a tag. A ": content" tag and a ": aspect" tag correspond to the message content 42. A search condition equation is described in the ": content" tag, and a format of a requested reply is described in the ": aspect" tag. In addition, a ": sender" tag and a ": receiver" tag correspond to the sending agent name 43 and the receiving agent name 44.

The example shown in FIG. 7 is a search request message that is generated by the user agent UA and is sent out to the facilitating agent FA when a user requests retrieval of a document that satisfies the conditions that a keyword "Java™" is included and a keyword "ORACLE™" or "MS ACCESS™" is included, but a keyword "visual Basic™" is not included. "Java™", "ORACLE™" "MS ACCESS™", and "visual Basic™" are registered trademarks.

This search request message requests the facilitating agent FA to reply about "URL", "title", "document size (byte)", "register data", "outline" and "search rank" as the search results to the user agent UA that originally sent out this search request message.

The facilitating agent FA acquires a set of names of recommended database agents DA with respect to the search re quest message of FIG. 7 by searching the facilitating database 3 therein.

Furthermore, FIG. 8 shows an example of a reply message that is supplied as a reply from the database agent DA that was recommended and actually searched for the document to the facilitating agent FA in response to the search request message of FIG. 7 in step Sd2 of the flowchart of FIG. 4. In this example, with respect to the first document that satisfies the search conditions provided by the search request message, "URL" is "http://www.fujitsu.co.jp", "title" is "homepage 1", "document size" is 1345 bytes", "register data" is "19971205T000000000", "outline" is "a computer in a space shuttle . . . ", and "search rank" is "31.3".

In the second document, "URL" is "http://abc.www.fujitsu.co.jp", "title" is "homepage 2", "document size" is "2012 bytes", "register data" is "19960303T000000000", "outline" is "very convenient information . . . ", and "search rank" is "12.5".

At the end of the reply message, "$DA_1$" is described in the ": sender" tag as the database agent name" that has sent out this reply message, and "FA" is described in the ": receiver" tag as the facilitating agent name to which this reply message is to be sent out.

In general, there are a plurality of database agents DA to which the facilitating agent FA sends out the search request message. Therefore, the facilitating agent FA integrates the contents of the reply messages from the plurality of database agents DA into one message in the same format as that of the reply messages, and sends out the message as the final reply to the user agent UA.

Next, the management of the keyword information or the like in the facilitating database 3 will be described.

As the scale of the document retrieval system 1 becomes larger, the keyword information stored in the facilitating database 3 becomes larger. This is disadvantageous for retrieval efficiency. It is unrealistic to store keyword information about all keywords of the documents on the document retrieval system 1 in the facilitating database 3. In this embodiment, only keyword information about keywords that satisfy a predetermined criterion is stored in the facilitating database 3.

In order to improve the retrieval efficiency in the entire system, it is preferable to preferentially store the keyword information about a keyword that is searched in a high frequency in the facilitating database 3. Therefore, since the facilitating database 3 of this embodiment stores access history information in addition to the keyword information, as described above, keyword information having an attribute value of "the number of times of search" smaller than a predetermined value is deleted from the facilitating database 3, referring to the access history information.

Alternatively, an index similar to an index referred to as "tfidf" in the field of document processing can be applied hereto by unit of a search engine and can be used as the standard of the keyword information to be stored in the facilitating database 3. For example, in a certain search engine, a function f (df, dbf) between the number of documents "df" containing a certain keyword and the number of search engines "dbf" having a document containing the keyword can be used as such an index. It is preferable that this function f (df, dbf) is a monotonically increasing function with respect to "df", and is a monotonically decreasing function with respect to "dbf". For example, the following equation is possible.
Equation 1

$$f(df, dbf)=df/dbf$$

However, the function f (df, dbf) is not limited thereto. It is sufficient that only keyword information including the search engine having a value larger than a predetermined value as the value of Equation 1 and the keyword is stored in the facilitating database 3.

In this manner, the keyword information of a search engine that includes documents containing the keyword in a relatively high proportion can be stored preferentially in the facilitating database 3. Therefore, it is possible to mediate the search request from the user to the database with the search engine in which a desired document can be encountered in a relatively high probability.

When the keyword information stored in the facilitating database 3 is incomplete, the following problem may occur. In the search of the facilitating database 3 in step Sf4 of the flowchart of FIG. 4, even if a document that satisfies the search conditions exists under some search engine, the keyword information of the document may not exist in the facilitating database 3. In this case, in this embodiment, the document that satisfies the search conditions can be retrieved when the facilitating agent FA broadcasts the search request message from the user agent UA to all the database agents DA.

Furthermore, each of the database 31 to 35 can be updated locally. In order to update the information of the facilitating database 3 in response to the local update of the databases, the database agents DA periodically send out the keyword information of documents that are included by their subordinate search engines in the form of a notification message as shown in FIG. 9 to the facilitating agent FA.

This notification message is described in the standard language of the agent system 2, and "advertise" at the head of the message indicates that this message is supplied to convey some information from an agent to another agent.

Furthermore, after the tag of "content", the heading of "keyword-info" is included. After the heading, a keyword and a database name containing the keyword, the number of documents containing the keyword in the database and the timestamp are added. When the facilitating agent FA receives this notification message from the database agent DA, the keyword information in the facilitating database 3 is updated based on the content thereof.

The database agent DA sends out advertisement information to the facilitating agent FA, whenever necessary, to inform the facilitating agent FA of the existence of itself or a receivable message in addition to the notification message for notifying the keyword information. The database agent and the facilitating agent FA receive messages or perform processing in a synchronization with each other. Therefore, this type of message can be sent out at any timing.

The database agent DA may inquire of the facilitating agent FA about the attribute value of "the number of times of search" of the access history information in the facilitating database 3, so that only the keyword information having an attribute value larger than a predetermined value as this attribute value can be selected as the keyword information to be notified to the facilitating agent FA. This prevents a notification message for notifying keyword information that is not stored in the facilitating database 3 from being generated. Therefore, the generation of wasteful traffic can be avoided.

Alternatively, as described above, the following embodiment applying an index similar to an index referred to as "tfidf" hereto by unit of a search engine is possible. In a certain search engine, a value defined by the function between the number of documents containing a keyword and the number of search engines having documents containing the keyword is obtained. Only the keyword information containing the search engine having a value larger than a predetermined value as the above-obtained value and the keyword may be selected as the keyword information to be notified to the facilitating agent FA. This embodiment has the same advantage as above.

Furthermore, not only does the database agent DA spontaneously send out a notification message to the facilitating agent FA, but also can the facilitating agent FA demand the database agent DA to notify the keyword information. In this case, for example, the facilitating agent FA sends out an achievement demand message as shown in FIG. 10 to the database agent DA. This achievement demand message is described in the standard language of the agent system 2, and "achieve" at the head indicates that this is an achievement demand message.

The database agent DA that has received this achievement demand message checks data stored in itself and documents in the subordinate database, generates a notification message in the same format as that of FIG. 9 and sends out the message to the facilitating agent FA.

The facilitating agent FA can be designed so as to refer to the attribute values of "the number of times of search" of the access history information in the facilitating database 3 and to demand the database agent DA to notify only the keyword information having an attribute value larger than a predetermined value as this value. This embodiment can prevent the generation of wasteful traffic because an achievement demand message to request the keyword information that is not stored in the facilitating database 3 is not generated.

Alternatively, as described above, the following embodiment applying an index similar to an index referred to as "tfidf" hereto by unit of a search engine is possible. In a certain search engine, a value defined by the function between the number of documents containing a keyword and the number of search engines having documents containing the keyword is obtained. The database agent DA is demanded to send out only the keyword information containing the search engine having a value larger than a predetermined value as the above-obtained value and the keyword. This embodiment has the same advantage as above.

Figure 11:
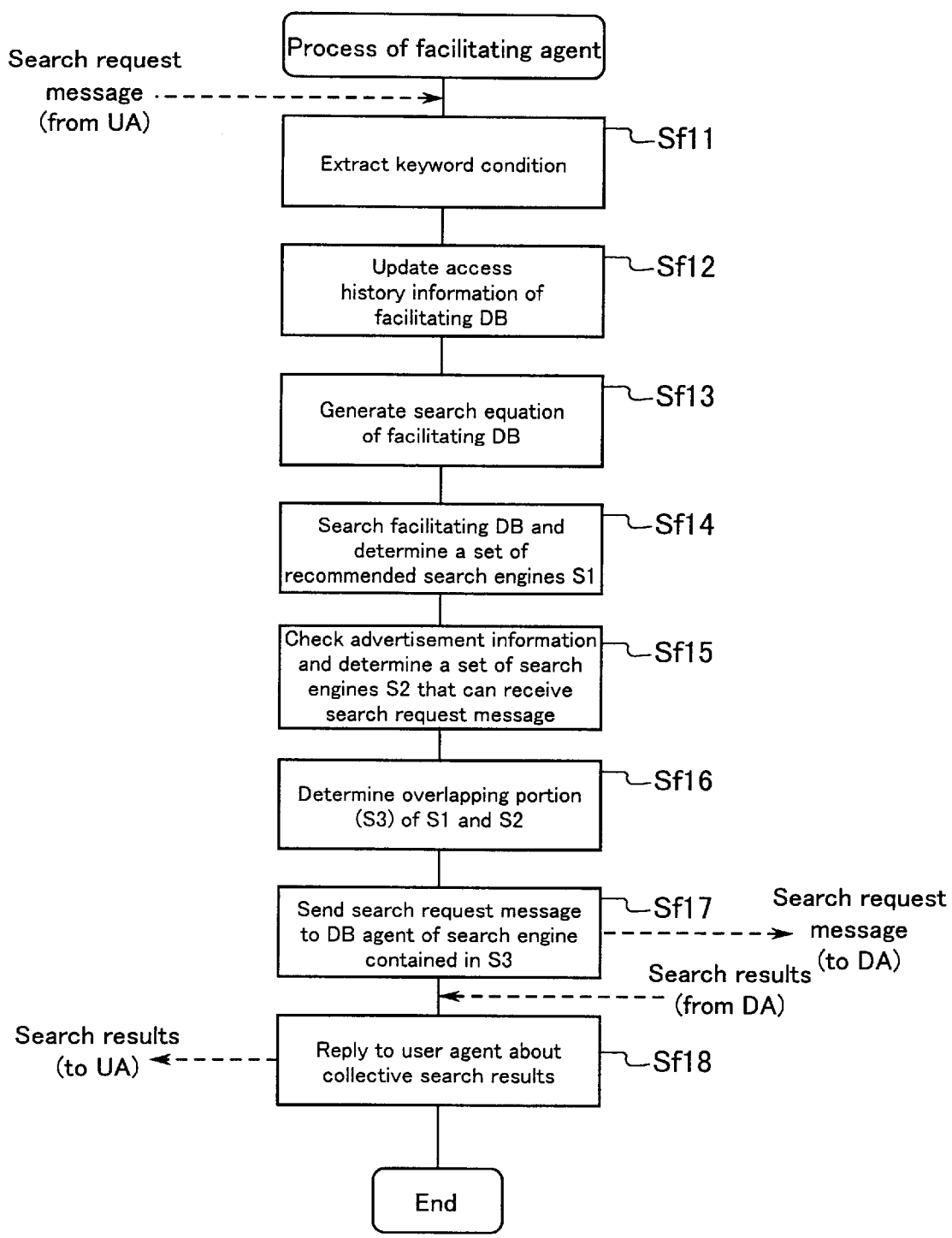
FIG. 11 is a flowchart showing a variation of the process procedure of the facilitating agent shown in FIG. 4.

Furthermore, as described above, in view of the existence of the notification message of the keyword information sent out by the database agent DA spontaneously or in response to a request from the facilitating agent FA, it is effective to perform steps Sf11 to Sf18 in the flowchart of FIG. 11, instead of the steps Sf1 to Sf7 shown in the flowchart of FIG. 4. Herein, the processes of the user agent UA and the database agent DA are the same as those in the flowchart of FIG. 4, so that the description thereof is omitted.

More specifically, when the facilitating agent FA receives a search request message from the user agent UA, it first extracts a portion regarding the keyword from the search conditions contained in the search request message (step Sf11).

Next, the facilitating agent FA updates the access history information in the facilitating database with respect to a set of keywords that satisfy the extracted keyword conditions (step Sf12), and generates a search condition equation with which to search the keyword information stored in the facilitating database 3 (step Sf13). The steps up to this step are the same as steps Sf1 to Sf3 described above.

Next, the facilitating agent FA searches the facilitating database 3 using the generated search condition equation. The facilitating database 3 refers to the keyword information stored therein and responds to the facilitating agent FA by supplying the set of search engine names having the document that satisfies the search conditions and the number of the documents in each of the search engines as the search results. The facilitating agent FA determines a set of search engines S1 that can be recommended as search engines to which the search request message is to be sent out based on this response (step Sf14).

Furthermore, the facilitating agent FA determines a set of search engines S2 that can receive the search request message by checking the advertisement information and the notification message from the database agent DA (step Sf15).

Then, the facilitating agent FA obtains an overlapping portion of the set S1 and the set S2 and it is denoted by set S3 (step Sf16).

Next, the facilitating agent FA sends out the search request message received from the user agent UA to the database agents DA whose subordinate search engines are contained in the set S3 specified in step Sf16, and awaits replies (step Sf17).

When the facilitating agent FA has received all the replies from all the database agents DA to which the search request message was sent out in step Sf17, it integrates all the replies into one message and sends out the message as the search result to the user agent UA that originally sent out the search request message (step Sf18).

The steps Sf11 to Sf18 as described above make it possible to determine the recommended databases not only based on the information of the facilitating database 3, but also referring to the advertisement information from the database agents DA. Therefore, a more appropriate reply can be supplied to the user.

As described above, according to the structure of this embodiment, the names of search engines that can be recommended as search engines to which the search request message from the user is to be sent out are specified by the facilitating agent FA referring to the keyword information and the access history information stored in the facilitating database 3 and, if necessary, the advertisement information from the database agent DA. Thus, since the user is not required to access a plurality of search engines individually for searching for a document, the operation procedure can be simplified.

Furthermore, the user agent UA, the facilitating agent FA, and the database agent DA communicate with each other in the standard language of the agent system 2. In addition, the database agent DA that has received the search request message from the facilitating agent FA converts the search request message to a language expression that the subordinate search engine can understand for search of the database DB. Therefore, advantageously, the user is not required to be aware of the difference in the search procedure or inquiry format between the search engines.

In the above description, the keyword information indicates the number of documents containing the keyword under each search engine. However, the keyword information may indicate not the number of documents but simply whether or not a document containing the keyword exists.

Embodiment 2

Next, a second embodiment of the present invention will be described with reference to the accompanying drawings.

The document retrieval system of this embodiment allows an independent search condition other than the designation of keywords to be contained in the search conditions by describing the independent search condition in the form of the logic operation with the search conditions designated by keywords.

For example, the condition concept of a document category can be a search condition. The document category refers to the type of a document, and can be arbitrarily defined by a concept to which each document seems to belong for organization of groups of documents. Specific examples of the document category include "specifications", "internet related documents", finance", "documents of the accounting department" and other concepts.

Each database agent DA notifies the facilitating agent FA of category information regarding the documents possessed by its subordinate search engine. Generally, the category information about the documents possessed by each search engine includes a plurality of categories.

The category information notified to the facilitating agent FA is stored in the facilitating database 3. More specifically, in the document retrieval system of this embodiment, the facilitating database 3 stores the category information indicating categories with respect to the documents possessed by each database in addition to the keyword information and the access history information. In this point, this embodiment is different from Embodiment 1.

Figure 12:
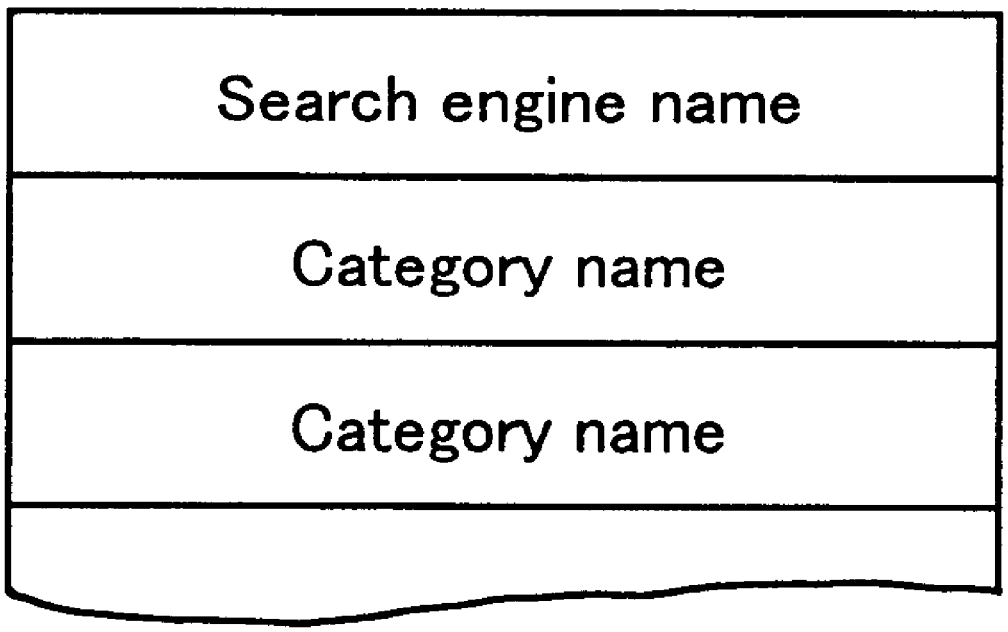
FIG. 12 is a diagram showing the structure of category information stored in the facilitating database in a document retrieval system of Embodiment 2 of the present invention.

In general, a search engine name and a plurality of category names of documents possessed by this search engine are described in the category information, as shown in FIG. 12.

The notification message shown in FIG. 13 is a message with which database agent DA (DA$_1$ in this case) notifies the facilitating agent FA of the category information. This notification message has the heading of "know-category" after the tag of "content", and a search engine name and category names of documents possessed by this search engine are added after the heading. When the facilitating agent FA receives the notification message from the database agent DA, the category information of the facilitating database 3 is updated based on the content thereof.

FIG. 14 shows a specific example of the search request message in this embodiment. In this search request message, "finance" is designated as the category of the document that is to be searched for in the search condition equation described after the tag ": content" in the search request message shown in FIG. 7 of Embodiment 1.

More specifically, this search request message requests a search engine containing "finance" as a category of documents to search for a document that satisfies the conditions that a keyword "Java™" is included and a keyword "ORACLE™" or "MS ACCESS™" is included, but a keyword "Visual Basic™" is not included. "Java™", "ORACLE™" "MS ACCESS™", and "Visual Basic™" are registered trademarks.

This search request message requests the facilitating agent FA to reply about "URL", "title", "document size (byte)", "register data", "outline" and "search rank" as the search results to the user agent UA that originally sent out this search request message.

Figure 15:
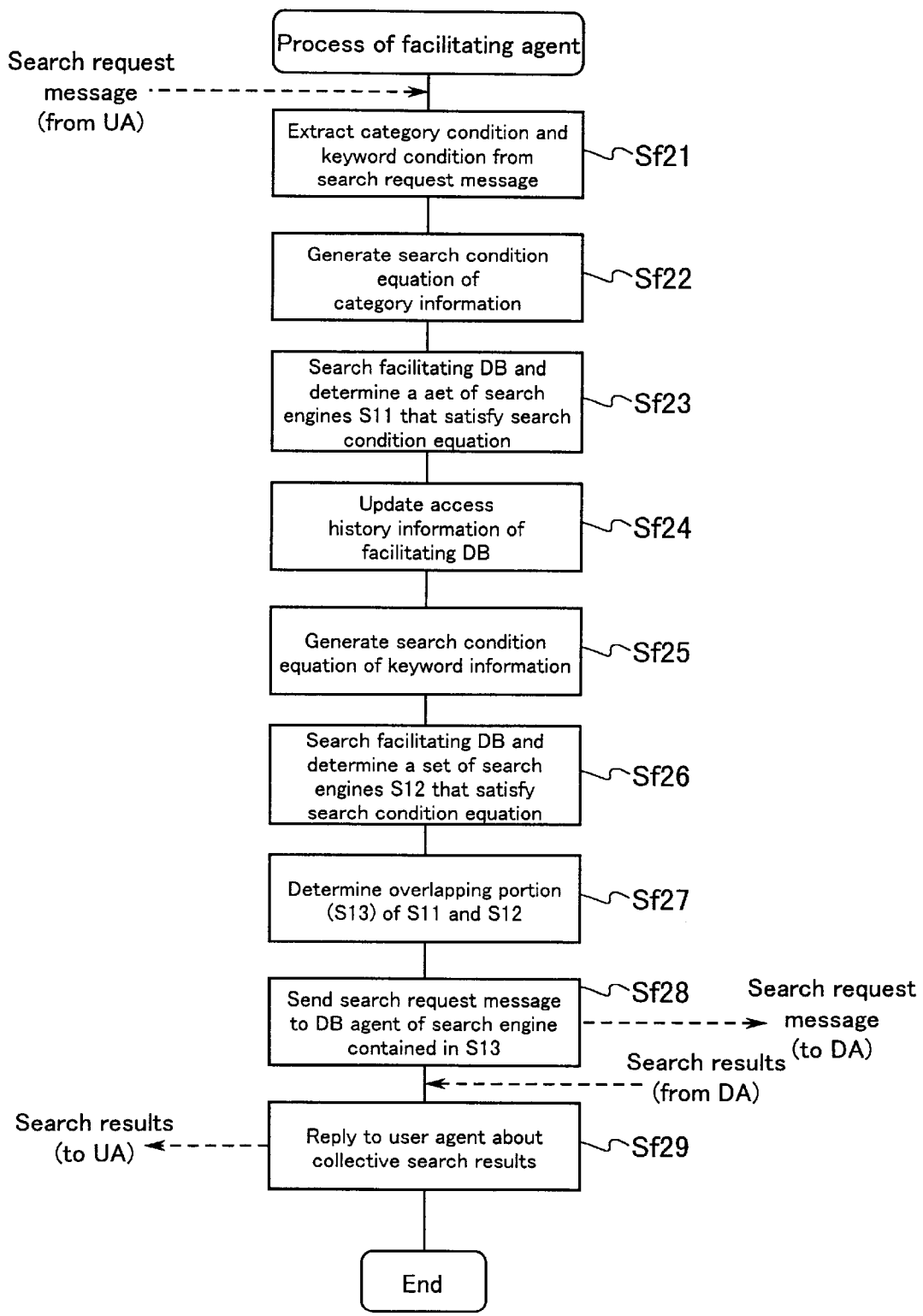
FIG. 15 is a flowchart showing the process procedure of the facilitating agent in the document retrieval system of Embodiment 2.

The facilitating agent FA performs steps Sf21 to Sf29 in the flowchart of FIG. 15, instead of the steps Sf1 to Sf7 shown in the flowchart of FIG. 4. Herein, the processes of the user agent UA and the database agent DA are the same as those in the flowchart of FIG. 4, so that the description thereof is omitted.

When the facilitating agent FA receives a search request message from the user agent UA, it extracts a portion regarding the category and a portion regarding the keyword from the search conditions contained in the search request message (step Sf21).

Next, the facilitating agent FA generates a search condition equation with which to search category information stored in the facilitating database 3 based on the extracted category condition (step Sf22). Furthermore, the facilitating database 3 is searched so that a set of search engines S11 that possess a document that satisfies the category condition designated by the search request message is obtained (step Sf23).

Then, the facilitating agent FA updates the access history information in the facilitating database 3 with respect to a set of keywords that satisfy the extracted keyword conditions (step Sf24), and generates a search condition equation with which to search the keyword information stored in the facilitating database 3 (step Sf25).

Next, the facilitating agent FA searches the facilitating database 3 using the generated search condition equation. The facilitating database 3 refers to the keyword information stored therein and responds to the facilitating agent FA by supplying the set of search engine names having the document that satisfies the search conditions and the number of the documents in each of the search engines as the search results. The facilitating agent FA determines a set of search engines S12 that can be recommended as search engines to which the search request message is to be sent out based on this response (step Sf26).

Then, the facilitating agent FA obtains an overlapping portion of the set S11 and the set S12 and it is denoted by set S13 (step Sf27).

Next, the facilitating agent FA sends out the search request message, received from the user agent UA to the database agents DA whose subordinate search engines are contained in the set S13 specified in step Sf27, and awaits replies (step Sf28).

When the facilitating agent FA has received all the replies from all the database agents DA to which the search request message was sent out in step Sf28, it integrates all the replies into one message and sends out the message as the search result to the user agent UA that originally sent out the search request message (step Sf29).

As described above, according to the structure of this embodiment, the user can search with the designation of the category of the document, so that the retrieval efficiency can improve further.

In the above description, both of the category condition and the keyword condition are designated in the search request message. However, the category condition alone can be designated. In this case, the facilitating agent may skip steps Sf24 to Sf27, and in step Sf28, the facilitating agent FA may send out the search request message received from the user agent UA only to the database agents DA whose subordinate search engines belong to the set S11 specified in step Sf23, and may await replies.

Embodiment 3

Next, a third embodiment of the present invention will be described with reference to the accompanying drawings.

Figure 16:
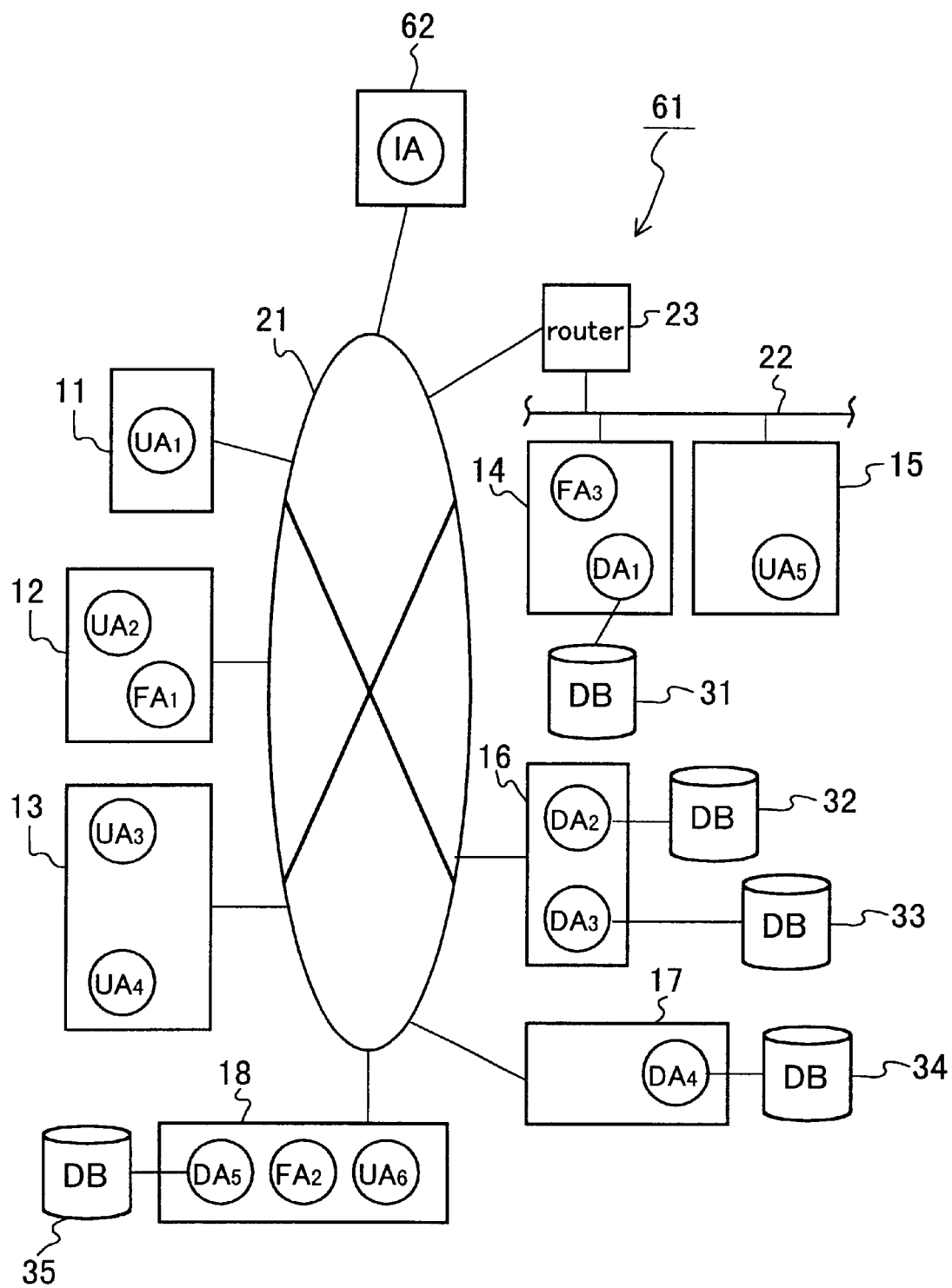
FIG. 16 is a block diagram showing a document retrieval system of Embodiment 3 of the present invention.
Figure 17:
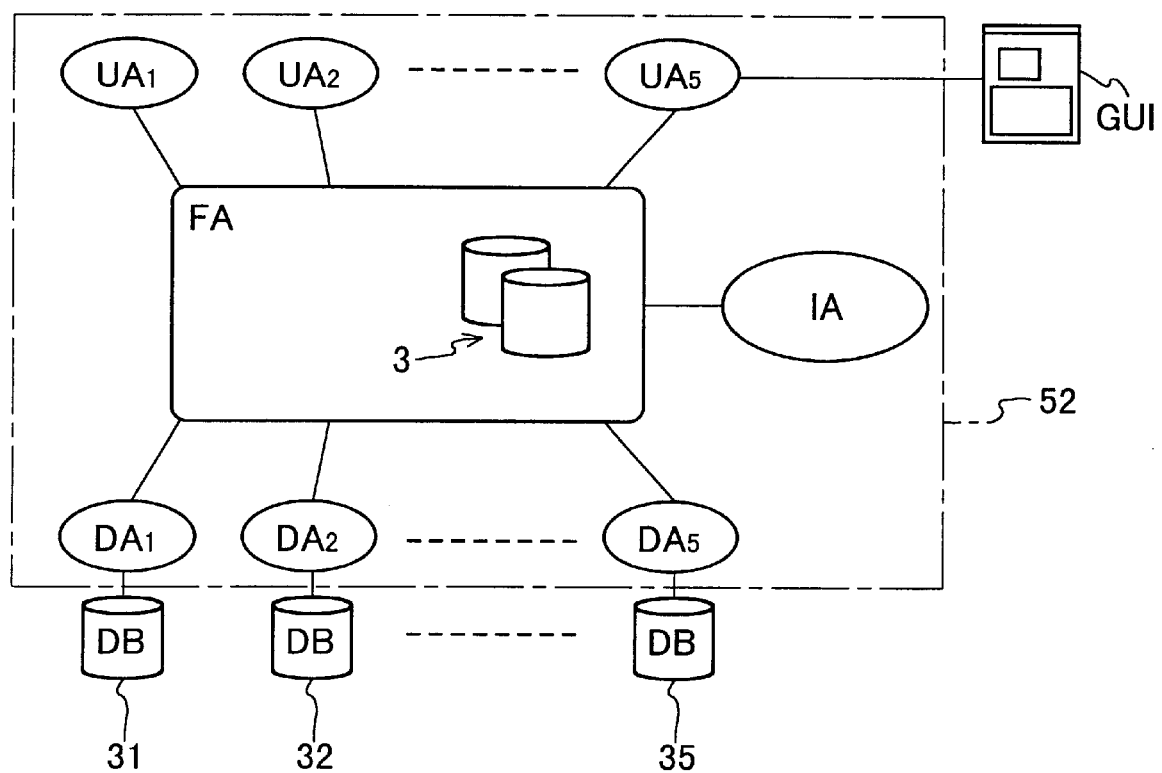
FIG. 17 is a block diagram showing the structure of the agent system of the document retrieval system of Embodiment 3 of the present invention.

As shown in FIG. 16, the document retrieval system 61 of this embodiment has the structure where an identification server 62 for providing identification information of the user is added to the document retrieval system 1 of Embodiment 1. Furthermore, the agent system 52 of the document retrieval system 61 has the structure where an identification agent IA for making an inquiry about identification information in the identification server 62 is further added to the agent system 2 described in Embodiment 1.

The identification server 62 stores, for example, user profile information as the identification information. Moreover, database profile information is stored in the facilitating agent FA. The user profile information includes information such as a user name, the availability level of the user, the department to which the user belongs, the post of the user, and the area where the user is located, as shown in FIG. 18A. The database profile information includes information such as a database name (or search engine name), the availability level of the database, the department to which the database belongs, and the area where the database is located, as shown in FIG. 18B.

This database profile information is stored in the facilitating agent FA by each database agent DA having notified the facilitating agent FA of the database profile information of its subordinate database beforehand.

Figure 19:
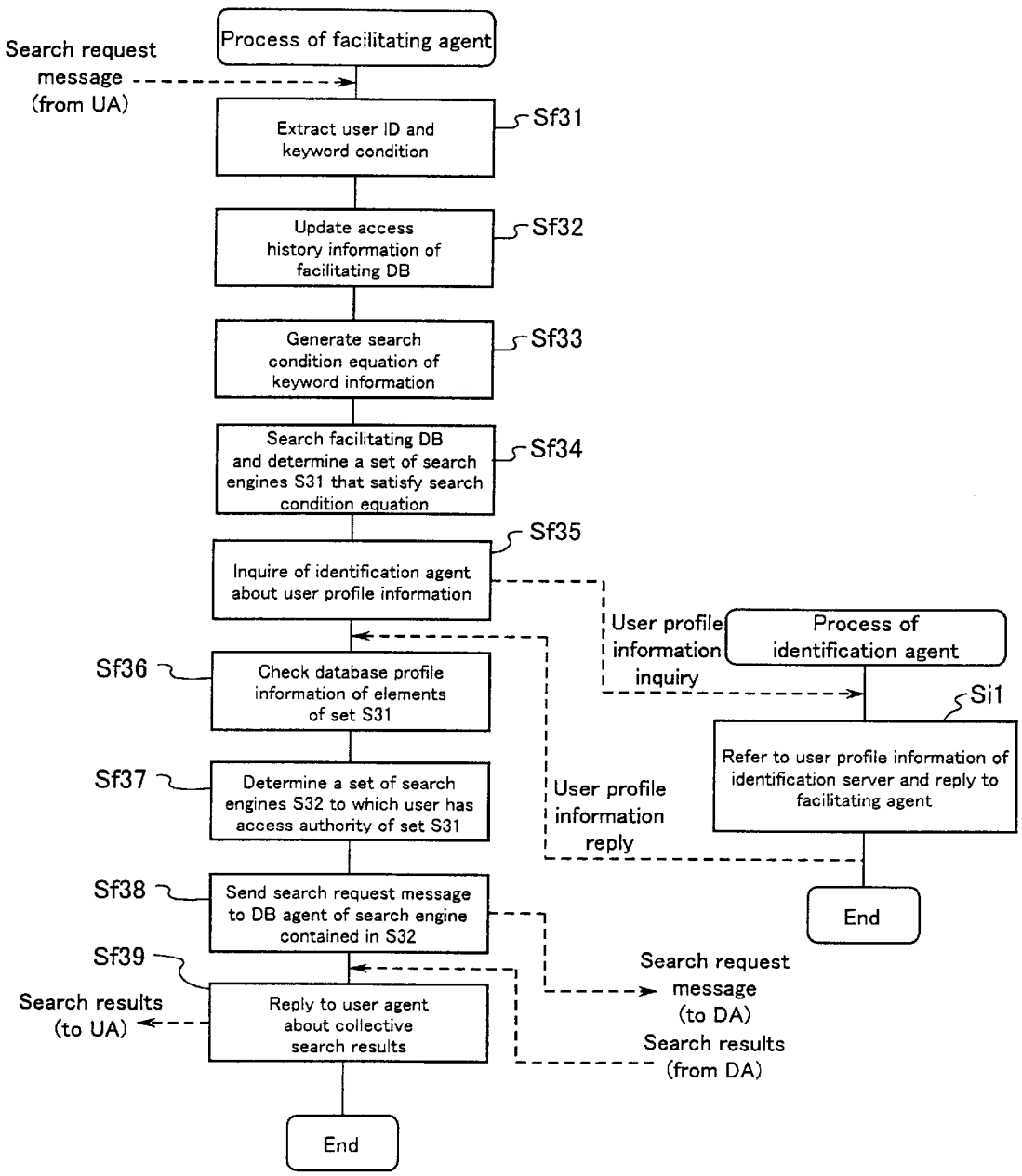
FIG. 19 is a flowchart showing the process procedure of the facilitating agent in the document retrieval system of Embodiment 3.

The facilitating agent in this embodiment performs steps Sf31 to Sf39 as shown in the flowchart of FIG. 19, instead of steps Sf1 to Sf7 shown in the flowchart of FIG. 4. FIG. 19 also shows the processing steps of the identification agent IA (step Si1). Herein, the processes of the user agent UA and the database agent DA are the same as those in the flowchart of FIG. 4, so that the description thereof is omitted.

When the facilitating agent FA receives a search request message from the user agent UA, it extracts a portion regarding the ID (identification) of the user and a portion regarding the keyword from the search conditions contained in the search request message (step Sf31).

Then, the facilitating agent FA updates the access history information in the facilitating database 3 with respect to a set of keywords that satisfy the extracted keyword conditions (step Sf32), and generates a search condition equation with which to search the keyword information stored in the facilitating database 3 (step Sf33).

Next, the facilitating agent FA searches the facilitating database 3 using the generated search condition equation. The facilitating database 3 refers to the keyword information stored therein and responds to the facilitating agent FA by supplying the set of search engine names having the document that satisfies the search conditions and the number of the documents in each of the search engines as the search results. The facilitating agent FA determines a set of search engines S31 that can be recommended as search engines to which the search request message is to be sent out based on this response (step Sf34).

Next, the facilitating agent FA inquires of the identification agent IA about the user profile information, based on the user ID extracted from the search request message in step Sf31 (step Sf35). Next, with respect to the search engines contained in the set S31, the database profile information stored in the facilitating agent FA is checked (step Sf36).

The identification agent IA refers to the user profile information stored in the identification server 62 and responds to the facilitating agent FA about the availability level of the user or the like (step Si1).

The facilitating agent FA obtains a set of search engines to which the user has access authorities (a subset S32) of the set S31, based on the response from the identification agent IA (step Sf37). More specifically, the availability level of the user and the availability level of each search engine are compared to obtain a set of search engines having an availability level equal to or lower than the availability level of the user, which is denoted by set S32.

Then, the facilitating agent FA sends out the search request message received from the user agent UA to the database agent DA whose subordinate search engine are contained in the set S32 specified in step Sf37, and awaits replies (step Sf38).

When the facilitating agent FA has received all the replies from all the database agents DA to which the search request message was sent out in step Sf38, it integrates all the replies into one message and sends out the message as the search result to the user agent UA that originally sent out the search request message (step Sf39).

As described above, the document retrieval system 61 of this embodiment allows the facilitating agent FA to check the profile information stored in the identification server 62 via the identification agent IA to prevent the search request message from being sent out to the search engines to which the user has no access authority. Thus, it is possible to prevent the generation of wasteful traffic.

In the example described above, it has been determined whether or not the user has the access authority using the availability level included in the profile information. However, other methods for the determination can be used.

The agents described in Embodiments 1 to 3 can be realized as a program that is executed on a computer. Furthermore, in the case where it is realized as a program, it is available in the form of various recording media, such as a magnetic tape, a CD-ROM, a floppy disk or the like, on which the program for realizing the present invention is recorded.

Furthermore, the structure and the data structure described in Embodiments 1 to 3 are only illustrative and not limiting the present invention. For example, the numbers of computer systems, databases, and agents are arbitrary. The structures of various kinds of information such as keyword information, access history information, category information, user profile information and database profile information are arbitrary, and attributes other than those described in Embodiments 1 to 3 can be added.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A document retrieval facilitating apparatus for facilitating document retrieval by mediating a search request containing a keyword to a database provided with a search engine, the search engine searching for a document with the keyword, the document retrieval facilitating apparatus comprising:
a facilitating database for storing relation information indicating a relationship between the keyword and the database provided with the search engine for each keyword; and
facilitating means for referring to the facilitating database using the keyword contained in the supplied search request so as to determine the database provided with the search engine to which the search request is to be sent out.

2. The document retrieval facilitating apparatus according to claim 1,
wherein the relation information includes a keyword and keyword information indicating whether or not a document corresponding to the keyword is included in each database provided with a search engine.

3. The document retrieval facilitating apparatus according to claim 1,
wherein the relation information includes keyword information indicating a number of documents corresponding to the keyword stored in each database provided with the search engine.

4. The document retrieval facilitating apparatus according to claim 1,
wherein the facilitating database further stores access history information indicating information about a keyword contained in a past search request, and the relation information is managed based on the access history information.

5. The document retrieval facilitating apparatus according to claim 1, further comprising an identification apparatus for checking whether or not the search request has an access authority to the database provided with the search engine,
wherein the facilitating means sends out the search request only to the database provided with a search engine to which the search request has an access authority.

6. A document retrieval facilitating apparatus for facilitating document retrieval by mediating a search request containing a keyword to a database provided with a search engine, the search engine searching for a document with the keyword,
the document retrieval facilitating apparatus comprising:
a facilitating database for storing category information indicating a type of a document possessed by the database provided with the search engine for each database provided with the search engine; and
facilitating means for referring to the facilitating database using a category name contained in the supplied search request so as to determine a database provided with the search engine to which the search request is to be sent out.

7. The document retrieval facilitating apparatus according to claim 6,
wherein the facilitating database stores a keyword and keyword information indicating whether or not a document corresponding to the keyword is included in each database provided with the search engine, and
facilitating means refers to both of the category information and the keyword information so as to determine the database provided with the search engine to which the search request is to be sent out.

8. The document retrieval facilitating apparatus according to claim 6,
wherein the facilitating database stores keyword information indicating a number of documents corresponding to the keyword stored in each database provided with the search engine, and
facilitating means refers to both of the category information and the keyword information so as to determine the database provided with the search engine to which the search request is to be sent out.

9. The document retrieval facilitating apparatus according to claim 6, further comprising an identification apparatus for checking whether or not the search request has an access authority to the database provided with the search engine,
wherein the facilitating means sends out the search request only to the database provided with the search engine to which the search request has an access authority.

10. A document retrieval system comprising:
a database provided with a search engine, the search engine searching for a document with a keyword; and
a document retrieval facilitating apparatus comprising:
a facilitating database for storing facilitating information indicating a relationship between the keyword and the database provided with the search engine; and
facilitating means for referring to the facilitating database so as to determine the database provided with the search engine to which the search request is to be sent out,
wherein the database provided with the search engine notifies the facilitating database of the facilitating information spontaneously.

11. The document retrieval system according to claim 10,
wherein the facilitating information includes relation information indicating a relationship between the keyword and the database provided with the search engine for each keyword and access history information indicating information about the keyword contained in past search requests, and
the database provided with the search engine selects the keyword for which the facilitating information should be notified to the facilitating database, based on the access history information.

12. The document retrieval system according to claim 10,
wherein the facilitating information includes relation information indicating a relationship between the keyword and the database provided with the search engine for each keyword, and
the database provided with the search engine determines whether or not the relation information indicating a relationship between a certain keyword and a certain database provided with a search engine should be notified to the facilitating database, based on a function between a number of documents corresponding to the keyword in the database provided with the search engine and a number of databases provided with search engines containing the documents corresponding to the keyword.

13. The document retrieval system according to claim 12,
wherein the function is a monotonically increasing function with respect to the number of documents corresponding to the keyword in the database provided with the search engine and monotonically decreasing function with respect to the number of databases provided with search engines containing the document corresponding to the keyword.

14. A document retrieval system comprising:
a database provided with a search engine, the search engine searching for a document with a keyword; and
a document retrieval facilitating apparatus comprising:
a facilitating database for storing facilitating information indicating a relationship between the keyword and the database provided with the search engine; and
facilitating means for referring to the facilitating database so as to determine the database provided with the search engine to which the search request is to be sent out,
wherein the facilitating means acquires the facilitating information to be stored in the facilitating database by inquiring of the database provided with the search engine.

15. The document retrieval system according to claim 14,
wherein the facilitating information includes relation information indicating a relationship between the keyword and the database provided with the search engine for each keyword and access history information indicating information about the keyword contained in past search requests, and
the facilitating means selects the keyword for which the facilitating information should be acquired from the database provided with the search engine, based on the access history information.

16. The document retrieval system according to claim 14,
wherein the facilitating information includes relation information indicating a relationship between the keyword and the database provided with the search engine for each keyword, and the facilitating means determines whether or not it makes an inquiry to acquire the relation information indicating a relationship between a certain keyword and a certain database provided with a search engine from the database provided with the search engine, based on a function between a number of documents corresponding to the keyword in the database provided with the search engine and a number of databases provided with search engines containing the document corresponding to the keyword.

17. A document retrieval system comprising:

a database provided with a search engine, the search engine searching for a document with a keyword; and a document retrieval facilitating apparatus comprising:
- a facilitating database for storing facilitating information indicating a relationship between the keyword and the database provided with the search engine for each keyword; and
- facilitating means for referring to the facilitating database using the keyword contained in the supplied search request so as to determine the database provided with the search engine to which the search request is to be sent out.

18. A document retrieval system comprising:

a database provided with a search engine; the search engine searching for a document with a keyword; and a document retrieval facilitating apparatus comprising:
- a facilitating database for storing category information indicating a type of a document possessed by the database provided with the search engine for each database provided with the search engine; and
- facilitating means for referring to the facilitating database using a category name contained in the supplied search request so as to determine the database provided with the search engine to which the search request is to be sent out.

19. A computer-readable recording medium storing a document retrieval facilitating program comprising processing steps for facilitating document retrieval by mediating a search request containing a keyword to a database provided with a search engine, the search engine searching for a document with the keyword, the processing steps being executed on a computer, the document retrieval facilitating program comprising:
- referring to a facilitating database that stores relation information indicating a relationship between the keyword and the database provided with the search engine for each keyword; and
- determining the database provided with the search engine to which the search request is to be sent out, based on comparison between the keyword contained in the supplied search request and the relation information.

20. A computer-readable recording medium storing a document retrieval facilitating program comprising processing steps for facilitating document retrieval by mediating a search request containing a keyword to a database provided with a search engine, the search engine searching for a document with the keyword, the processing steps being executed on a computer, the document retrieval facilitating program comprising:
- referring to a facilitating database that stores category information indicating a type of a document possessed by the database provided with the search engine for each database provided with the search engine; and
- determining the database provided with the search engine to which the search request is to be sent out, based on comparison between a category name contained in the supplied search request and the category information.

* * * * *